March 5, 1929.  C. T. ULREY  1,704,267
SAFETY DEVICE FOR ELECTRON DISCHARGE TUBES
Filed July 1, 1925
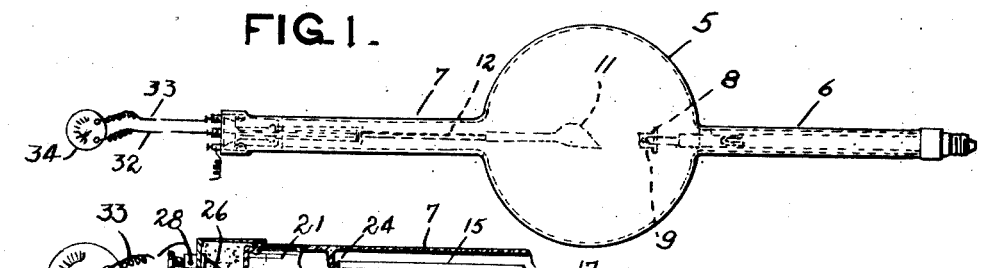
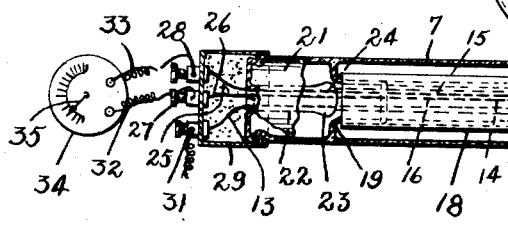
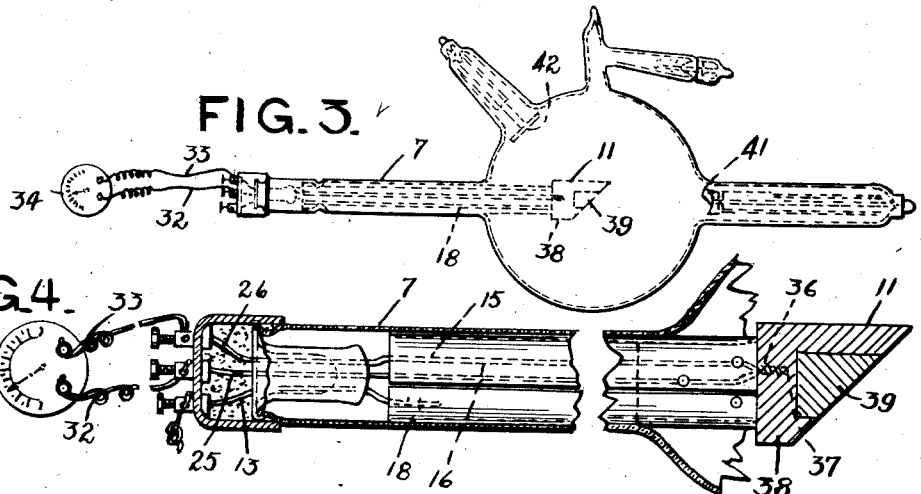
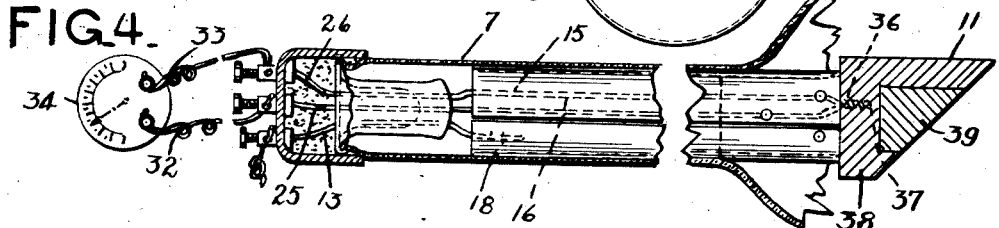
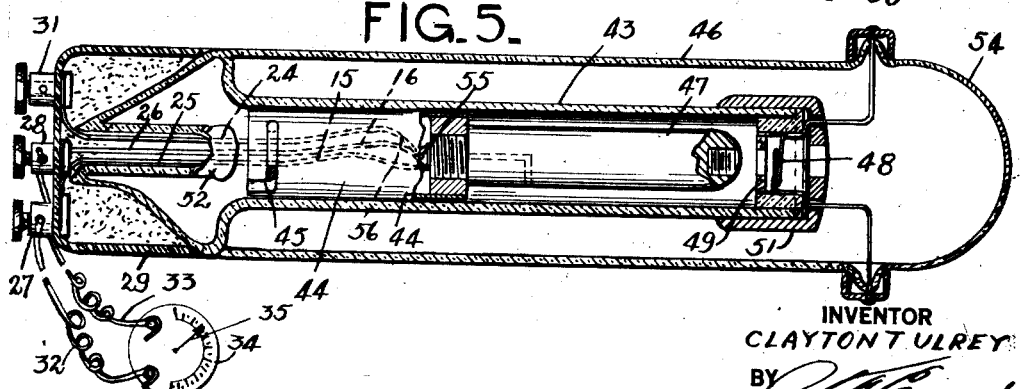
INVENTOR
CLAYTON T. ULREY
BY
ATTORNEY Patented Mar. 5, 1929.

1,704,267

UNITED STATES PATENT OFFICE.

CLAYTON TRIDLE ULREY, OF EAST ORANGE, NEW JERSEY, ASSIGNOR TO WESTINGHOUSE LAMP COMPANY, A CORPORATION OF PENNSYLVANIA.

SAFETY DEVICE FOR ELECTRON-DISCHARGE TUBES.

Application filed July 1, 1925. Serial No. 40,834.

This invention relates to X-ray tubes and more particularly to a safety device for such tubes to prevent the target or other parts of the tube from becoming overheated or the operation of the tube otherwise impaired.

X-ray tubes are sometimes destroyed by operating the tube under conditions such that the target becomes heated to a temperature at which it melts, this being especially true of targets comprising an insert of a good ray-radiating material, like tungsten, secured in a backing material such as copper. On account of the heat capacity of such targets, temperature equilibrium is not reached for a considerable time when the tube is operated at normal load. However, if the tube is overloaded or if operated for too long a time, the target may become overheated.

Furthermore, in certain types of X-ray tubes which are not provided with facilities for external cooling, it is not possible to operate the tube continuously or over prolonged intervals without endangering the tube. With such tubes, as well as the externally cooled type, it is not possible to determine when the danger point is reached.

Therefore, the present invention provides a simple and inexpensive expedient which will enable one to accurately determine the temperature conditions prevailing within the tube so that he may be informed when the danger point is being approached. More specifically, the invention contemplates the employment of a thermocouple within the X-ray tube, said couple being so disposed with respect to the target or other parts of the tube subject to heating, that the heat therefrom will set up a thermo-electric current which may be read in terms of millivolts on a suitably calibrated millivoltmeter to indicate the temperature of the target. In addition, the millivoltmeter may be marked by a red danger line, so that the indicating hand on the millivoltmeter will indicate when the danger is being approached.

Although reference has been made to the employment of the present invention in connection with X-ray tubes containing targets composed partly of copper, it is obvious that it is applicable to any type of X-ray tube in which abnormal temperature conditions may be detrimental to the operation of the tube, for example, such X-ray tubes which contain massive tungsten targets, or tubes of the gas type in which the cathode may become excessively heated or in which insulating housings are employed to prevent long discharge paths and in which the housing may become heated to a temperature at which the insulating material becomes electrically conducting.

It is, therefore, an object of my invention to provide a simple and inexpensive device for operating an X-ray tube or other electrical discharge device in a safe and reliable manner.

Other objects of my invention will be apparent as the description is read.

Referring to the drawings, Fig. 1 is a longitudinal sectional view of a conventional X-ray tube of the high vacuum, high voltage type with the present invention embodied therein;

Fig. 2 is an enlarged longitudinal section of the anode end of the X-ray tube illustrated in Fig. 1 and illustrating more clearly the thermocouple embodied therein;

Fig. 3 is a longitudinal sectional view of a gas-filled X-ray tube employing a cold cathode, to which the present invention has been applied;

Fig. 4 is an enlarged longitudinal sectional view of the anode portion of the X-ray tube illustrated in Fig. 3;

Fig. 5 is a longitudinal sectional view of another type of X-ray tube employed for radiographic purposes in which the invention has been incorporated.

Referring to Figure 1 the X-ray tube illustrated therein comprises a glass envelope 5 having outwardly extending arms 6 and 7 which are closed at their outer ends. Within the neck or arm 6 is supported the usual cathode 8 capable of being incandesced and focusing device 9. A target 11 consisting of a mass of tungsten or other desirable ray-radiating material, is supported within the arm 7 by a rod 12 extending from the target 11. The rod 12 may be secured to the arm in a manner more fully described hereinafter. Connected to the target rod or shank 12 is a leading-in conductor 13 which may be connected to the secondary of a high voltage transformer according to standard practice.

The tube thus far described is of well known design and extensively used in commerce. Such tubes are adapted for treatment purposes and in order to obtain the desired depth of ray penetration extremely high voltages of the order of 200,000 volts are employed. In operation of such tubes, considerable heat is developed in the target which results at times in melting the target or in releasing gases therefrom which impairs the high vacuum thus causing the tube to puncture through destructive discharges.

In order to prevent the target from reaching a temperature sufficiently high to detrimentally affect the operation of the tube, there is embodied in the tube, in accordance with the present invention, a safety device. Referring to Fig. 2, this device, more specifically, comprises a thermocouple 14 consisting of a copper wire 15 and another wire 16 which latter is made of a different material from the wire 15, and is preferably made of advance. These two wires are joined together at 17 and secured to the shank or supporting arm 12 of the target 11. The location of the thermocouple with respect to the target should be such that the temperature of the latter will govern the temperature to which the thermocouple is heated in order that the thermocouple may effectively operate to indicate the temperature of the target. The anode shank 12 is usually secured in a metal sleeve 18 which latter snugly fits a reentrant tube 19 of glass, the latter being fused to the arm 7 of the tube.

The X-ray tube has a lower chamber 21 in which is sealed a reentrant tube 22 having a press 23. The thermo-couple wires 15 and 16 are joined to suitable sealing material 24 such as molybdenum, dumet, platinum, tungsten, or the like, which will hermetically seal in the press. Disposed exteriorly of the press are the leading-in wires 25 and 26 which are joined to the seals 24. These wires may consist of copper and be joined to metallic contact plugs or binding posts 27 and 28 in a suitable base 29. The leading-in wire 13 is connected to a third binding post 31.

Connected to the binding posts 27 and 28 through conductors 32 and 33 is a suitably calibrated indicating device 34, which may be calibrated so as to indicate various temperature conditions in the X-ray tube and to have marked thereon a danger point which when the indicating hand 35 approaches or reaches, will inform the operator of the tube that the operation thereof should cease.

The indicator device may consist of any standard form of millivoltmeter or galvanometer, the metal parts being connected together and to one terminal of the instrument so as to prevent detrimental arcing therein. The construction and functioning of such instruments are well known and therefore need no elucidation here.

The operation of the thermocouple is as follows, assuming that the X-ray tube is in operation. The impact of the electrons upon the target causes the latter to be heated. The temperature of the target rises as the operation of the tube continues and if operated for too long a period or under abnormal voltages, the temperature reaches a point where the tungsten melts which results in impairment of the tube either through puncturing the glass walls of the tube or ruining the target. The heating of the target results in heating the juncture of the thermocouple which is secured to the target or stem. This results in thermal electromotive force being generated in the thermal couple circuit which increases with the difference in temperature between the heated junction of the two wires forming the thermocouple and the terminals of the conductors 25 and 26. This electromotive force actuates the galvanometer or millivoltmeter, the indicating hand of which can be directly observed to determine the temperature conditions of the target. When the indicator approaches or reaches a danger line plainly marked on the face of the millivoltmeter it will inform the operator that the temperature of the target has reached the danger point. The position of the danger line can be readily determined through test.

According to Fig. 3, the present invention may be applied to a gas-filled tube such as is commonly employed in certain countries. In this tube the target 11 is supported by a metallic sleeve 18 engaging an extension 7. The construction of the tube with respect to the application of a thermocouple thereto is substantially the same as that illustrated in Figs. 1 and 2, the only distinction being that the junction 36 of the thermocouple wires 15 and 16 are connected directly at 37 to the target 11. In addition the gas tube differs from the form of tube illustrated in Figs. 1 and 2 in that the target is composed of a backing 38 of copper or other good heat conducting material in which is disposed a focal spot 39 of thorium or the like.

In tubes of the type shown in Fig. 3, a cold cathode 41 is employed, the electron stream being formed by bombardment of the cathode by ions produced by passing a high potential discharge through the residual gas within the tube and between an auxiliary anode 42 and the cathode. The bombardment of the cathode causes considerable heating thereof which may result in impairment of the tube. In order to avoid such overheating of the cathode, a thermal-couple may be applied thereto similarly to the manner in which it is applied to the target.

The type of X-ray tube illustrated in Fig. 5 incorporates certain features of construction which are embodied in each of the tubes previously described. Some of these features are the utilization of a residual gas pressure of the order of that used in the well known gas tubes and the employment of a hot cathode such as used in the modern high vacuum X-ray tube. One of the important features of this tube is the provision of means for preventing destructive arcing between the cathode and the lower end of the anode shank.

Such means comprises an insulating and heat resistant reentrant tube 43 which is closely spaced from the anode shank and completely surrounds the same. The reentrant tube also serves as a support for the anode through the instrumentality of a sleeve 44 which snugly fits inside the reentrant tube and is firmly locked thereto by means of one or more bayonet connections 45. The details of construction of this tube are fully described and claimed in applicant's copending application Serial No. 38,395, filed June 20, 1925, entitled Dental X-ray tube and assigned to the Westinghouse Lamp Company.

The tube illustrated in Fig. 5 comprises essentially an enclosing envelope 46, a reentrant tube 43, an anode 47, a cathode 48, a focusing device 49, a metal screen or cap 51, a seal or press 52 and suitable base 29. The elements of the tube are so arranged and disposed with respect to each other that useful X-rays may be generated and emitted from the tube from the end 54 thereof.

The thermocouple may consist of a copper wire 15 and a wire 16 of advance metal. These wires may be welded together at one end and fastened to the base of the anode shank by means of the same screw 55 which is employed to secure the leading-in wire 56 to the anode for supplying current thereto. The thermocouple may be disposed within the metal supporting sleeve 44. The thermocouple wires 15 and 16 may be connected to suitable seal wires 24 such as molybdenum or dumet which latter may be joined to leading-in conductors 25 and 26 connected to binding posts 27 and 28 of the base 29. A millivoltmeter or galvanometer 34 suitably calibrated and having an indicator 35, may be connected by wires 32 and 33 to the binding posts 27 and 28, respectively. The thermocouple operates in the same manner as described previously.

In tubes of the type illustrated in Fig. 5, destruction or impairment of the operation thereof may result by overloading the tube. If the tube is operated for too long an interval or until such a temperature is attained by the reentrant tube as to render the same electrically conductive, or to decrease its dielectric strength, the tube will puncture. In addition, impairment of the operation of the tube may result by excessive heating of the target. The present invention when embodied in a tube of this type furnishes a safety device which prevents abuse on the part of the operator.

Furthermore, the present invention contemplates the application of the thermocouple to any part of the tube which may become heated to such an extent as to impair the operation of the device. For example, if desired, connection may be made directly to reentrant tube 43, Fig. 5.

Modifications of the foregoing invention may occur to those skilled in the art, but such as come within the scope of the appended claim are contemplated by me as coming within the spirit of the invention.

What is claimed is:

An X-ray tube comprising an envelope, a reentrant tube of insulating material concentrically disposed with respect to said envelope, an anode and a cathode supported by said reentrant tube, and means for indicating temperature conditions disposed within said reentrant tube and in thermal relation with respect to said anode.

In testimony whereof, I have hereunto subscribed my name this 27th day of June, 1925.

CLAYTON TRIDLE ULREY.